(12) United States Patent
Rutschmann et al.

(10) Patent No.: US 7,404,387 B2
(45) Date of Patent: Jul. 29, 2008

(54) INTAKE SYSTEM FOR AN INTERNAL COMBUSTION ENGINE

(75) Inventors: Erwin Rutschmann, Tiefenbronn (DE); Matthias Benz, Oberriexingen (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 17 days.

(21) Appl. No.: 10/567,376

(22) PCT Filed: Mar. 15, 2005

(86) PCT No.: PCT/EP2005/002725

§ 371 (c)(1),
(2), (4) Date: Jul. 20, 2006

(87) PCT Pub. No.: WO2005/098215

PCT Pub. Date: Oct. 20, 2005

(65) Prior Publication Data

US 2007/0137603 A1   Jun. 21, 2007

(30) Foreign Application Priority Data

Mar. 30, 2004 (DE) .................. 10 2004 015 339

(51) Int. Cl.
*F02M 35/10* (2006.01)
(52) U.S. Cl. ................. 123/184.51; 123/184.34; 123/184.53

(58) Field of Classification Search ........... 123/184.51, 123/184.53, 184.56, 184.57, 54.1–55.7, 184.28, 123/184.34
See application file for complete search history.

(56) References Cited

U.S. PATENT DOCUMENTS 5,490,484 A * 2/1996 Rutschmann .......... 123/184.57
6,250,272 B1 * 6/2001 Rutschmann et al. .. 123/184.57

FOREIGN PATENT DOCUMENTS

| DE | 198 42 724 A1 | 3/2000 |
| DE | 201 13 496 U1 | 10/2001 |
| EP | 0 402 091 A | 12/1990 |
| EP | 1 136 674 A | 9/2001 |
| JP | 03088913 A * | 4/1991 |

OTHER PUBLICATIONS

International Search Report No. PCT/EP2005/002725, dated Jul. 22, 2005.

* cited by examiner

*Primary Examiner*—Noah Kamen
(74) *Attorney, Agent, or Firm*—Crowell & Moring LLP

(57) ABSTRACT

An intake system for an internal combustion engine having at least two cylinder bank rows, each being assigned an intake bend having individual tubes leading to the cylinders, where the intake bends are interconnected in terms of fluid flow via a distributor tube (38) and at least one resonance tube (30) equipped with a switch valve, where the resonance tube and the distributor tube are combined in a central intake module.

11 Claims, 4 Drawing Sheets

INTAKE SYSTEM FOR AN INTERNAL COMBUSTION ENGINE

This application is a national phase application of International application PCT/EP2005/002725, filed Mar. 15, 2005 and claims the priority of German application No. 10 2004 015 339.6, filed Mar. 30, 2004, the disclosure of which are expressly incorporated by reference herein.

BACKGROUND AND SUMMARY OF THE INVENTION

The present invention relates to an intake system for an internal combustion engine, and in particular to an intake system interconnecting multiple cylinder banks.

Intake systems with resonance charging for optimum filling of the cylinders at different rotational speeds and/or in different load ranges are known from the state of the art. For example, the present applicant has a intake system in mass production (see Germany Utility Model DE 201 13 496 U1, for example) in which the intake bends provided for both rows of cylinders are interconnected via a distributor and a resonance tube. The cylinders are supplied with combustion air through the distributor tube, while the resonance tube equipped with a switch valve serves to adjust the inherent frequency to the intake frequency in a known manner.

The object of the present invention is to improve upon the properties of generic intake systems as they pertain to fluid technology and gas dynamics.

This object is achieved by an intake system for an internal combustion engine having at least two cylinder bank rows, an intake bend with individual tubes leading to the cylinders being assigned to each cylinder bank row, whereby the intake bends are interconnected via a distributor tube and at least one resonance tube equipped with a switch valve, where the resonance tube and the distributor tube are combined to form a central intake module.

With the integration of the resonance tube into the distributor tube, the vibrating path distribution of the intake system can be improved and furthermore, the internal flow and pre-intake inflow into the distributor tube can be unthrottled, resulting in a corresponding increase in engine performance. Due to the design of the two components in a common intake module, the component complexity is reduced so a compact intake system can be produced.

An especially advantageous structural design of the intake module is ensured when it is designed with an oval cross section, whereas the resonance tube integrated into the intake module is designed with essentially a circular cross section. The intake module is designed with dimensions such that the resonance tube is accommodated on the one hand, while on the other hand there remains enough design space to form the distributor channel on the side next to the resonance tube.

An embodiment that is advantageous in terms of manufacturing technology and promotes the idea of integration is obtained when part of the lateral surface of the resonance tube is formed by the housing wall of the intake module itself.

To allow the intake air to pass unhindered through the individual tubes to the cylinders, the wall section of the resonance tube separating the connecting channel and the resonance channel is chamfered on both end faces.

The housing wall of the intake module has an opening in the area of the resonance tube into which the housing of the resonance valve can be inserted in a modular fashion and secured.

This embodiment of the intake system consists essentially of the intake module forming the distributor tube and the resonance tube, with one intake bend attached to each of its two end faces. All three components are preferably made of plastic.

Other objects, advantages and novel features of the present invention will become apparent from the following detailed description of the invention when considered in conjunction with the accompanying drawings for example.

DETAILED DESCRIPTION OF THE DRAWINGS

Figure 1:
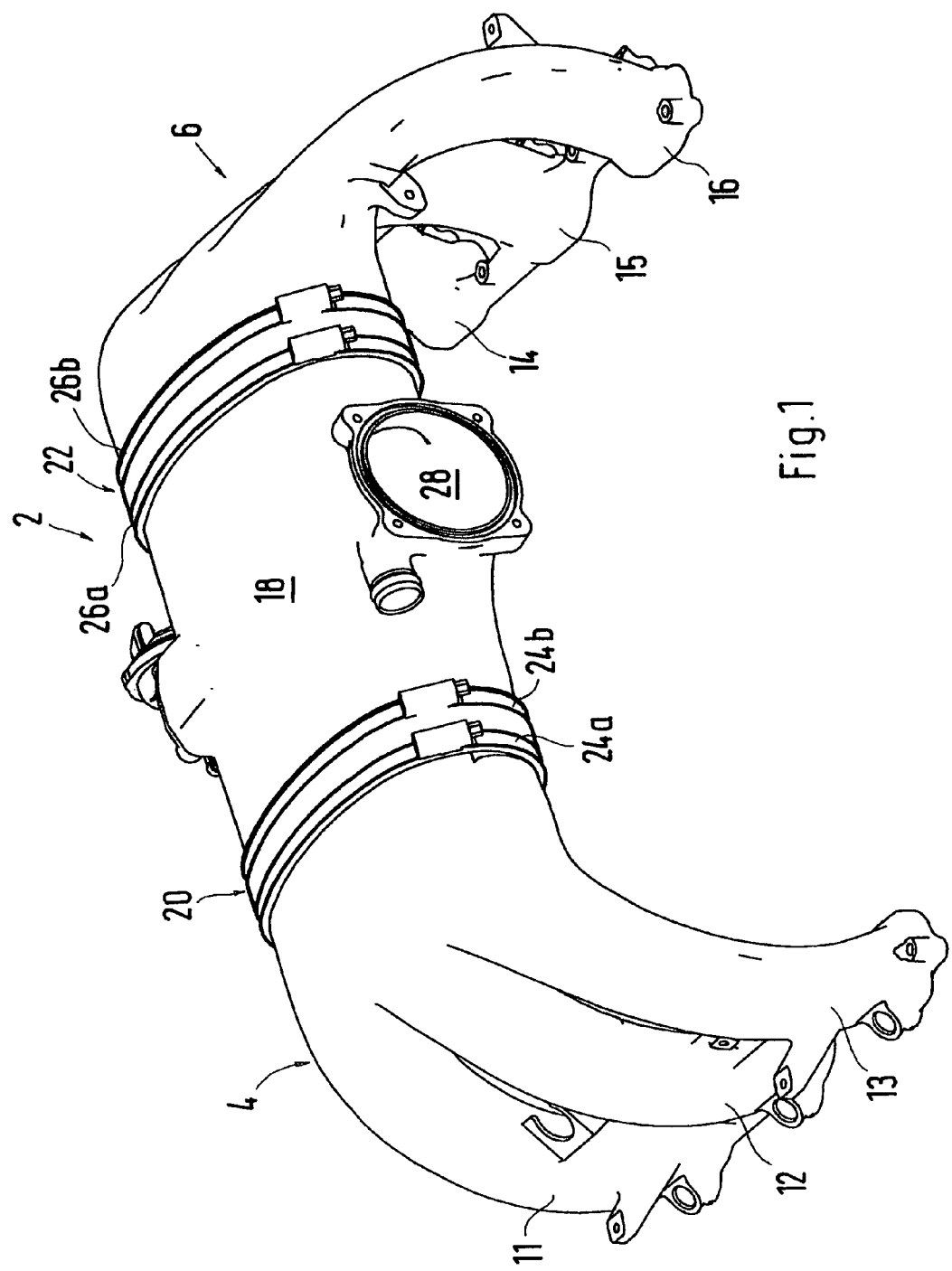
FIG. 1 shows an overall view of a intake system in accordance with an embodiment of the present invention.
Figure 2:
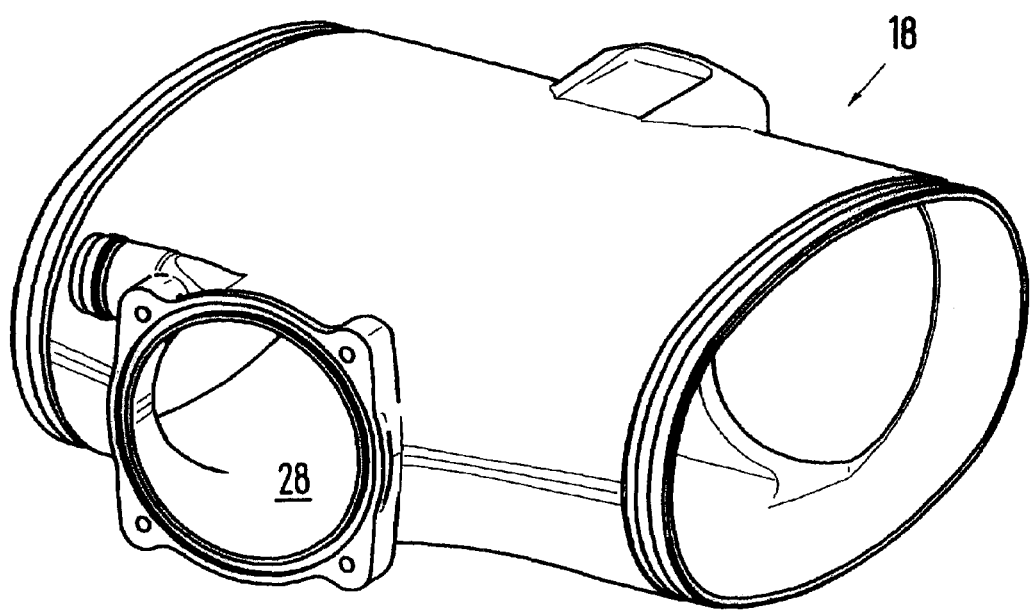
FIG. 2 shows a perspective view of an intake module of the intake system of FIG. 1.
Figure 3:
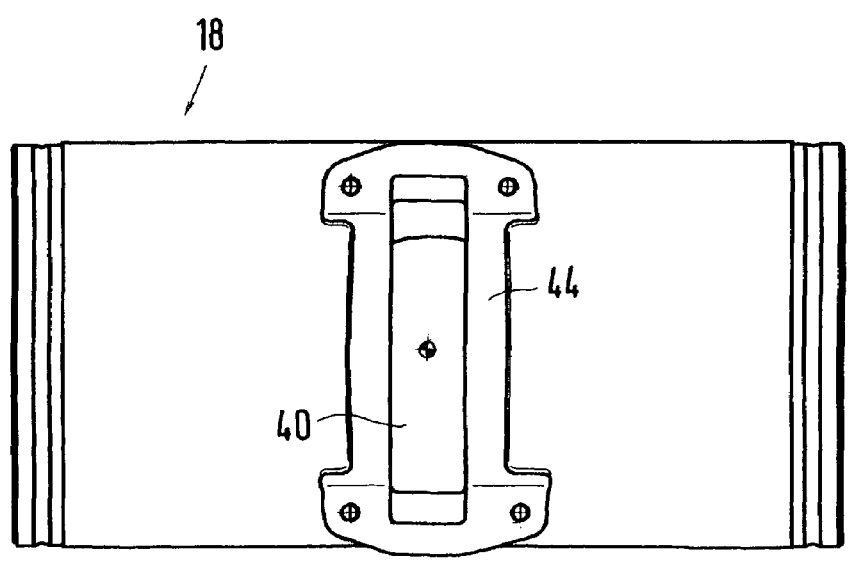
FIG. 3 shows a side view of the intake module of FIG. 1.
Figure 4:
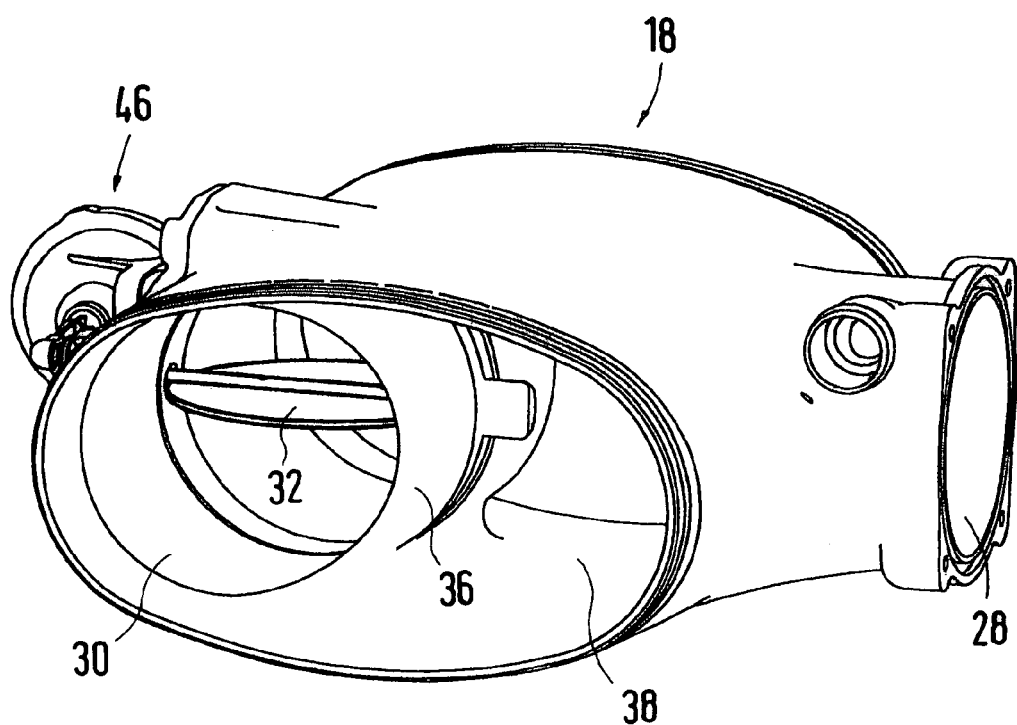
FIG. 4 shows another perspective view of the intake module of FIG. 1.
Figure 5:
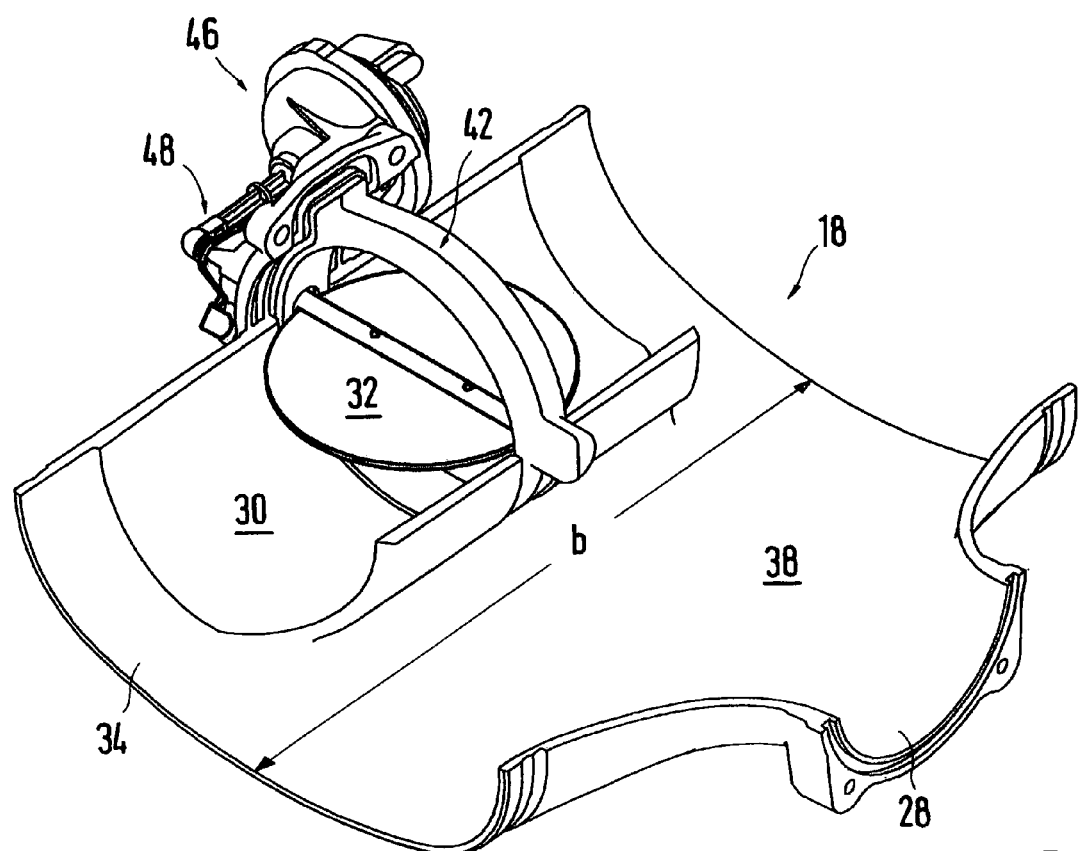
FIG. 5 shows the intake module in a cutaway diagram of the intake module of FIG. 1 in a perspective view.
Figure 6:
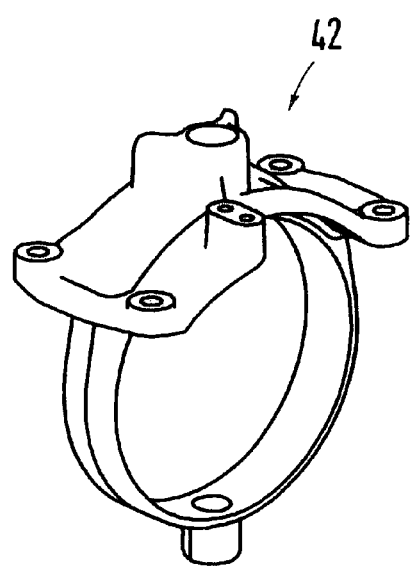
FIG. 6 shows a perspective view of the resonance valve housing shown in FIG. 5.

The intake system 2 designed for a six-cylinder boxer engine has one intake bend 4 and 6 having individual intake tubes 11 through 13 and/or 14 through 16 for each cylinder row, each individual intake tube leading to a cylinder head (not shown). The two intake bends 4 and 6 are connected to a central intake module 18. In the present exemplary embodiment, each connection is established with the help of a rubber sleeve 20 and 22, each sleeve being secured with two tube clamps 24a, 24b and 26a, 26b. As shown in FIG. 2 and FIG. 4 in particular, the intake module 18 is designed with an oval or elliptical shape and in its lateral surface has a connection 28 for a switch valve housing (not shown). A resonance tube 30 whose flow channel is monitored by a switch valve 32 is integrated into the interior of the intake module 18. The resonance tube 30 is designed in one piece from the housing wall 34 of the intake module 18, with a wall section 36 of the resonance tube 30 subdividing the interior of the intake module 18 accordingly. The interior of the intake module 18 and the resonance tube 30 are of dimensions such that a distributor space 38 remains at the side next to the resonance tube 30, said space being formed by the housing walls of the intake module 18 and the wall section 36 of the resonance tube 30 and the combustion air is supplied through this space to the individual cylinders. To allow intake air to also reach the middle individual tubes 12 and 15 and/or the rear individual tubes 11 and 14, the wall section 36 is chamfered at its two end faces and is designed to be shorter in its longitudinal extent than the width b of the distributor space 38.

A rectangular opening 40 is created on the side of the intake module 18 opposite the connection 28, a resonance valve housing 42 being inserted into this opening and attached to a flange 44. The switch valve 32 monitoring the flow channel is mounted in the resonance valve housing 42. The switch valve 32 is controlled by reduced pressure, and therefore a vacuum unit 46 is provided on the intake module 18 and connected via a rod 48 to the switch valve 32.

The resonance intake system functions in the known way. In lower and middle rotational speed ranges, preferably between 2000 and 5000 rpm, the switch valve 32 arranged in the resonance tube 30 is closed, whereas the switch valve 32 is opened in an upper rotational speed range, e.g., between 5,000 and 7,000 rpm, so the natural frequency of the intake system is again adapted for optimum filling of the cylinders accordingly.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An intake system for an internal combustion engine having at least two cylinder bank rows, comprising:
   an intake bend assigned to each cylinder bank row, each intake bend including at least one intake tube leading to each cylinder in the cylinder bank row to which the intake bend is assigned;
   distributor tube for distributing intake air;
   at least one resonance tube equipped with a switch valve, wherein the intake bends are in fluid communication with the distributor tube and the at least one resonance tube, and the resonance tube and the distributor tube are combined in a central intake module, and
   wherein a portion of a lateral surface of the resonance tube is formed by a wall of the intake module.

2. The intake system according to claim 1, wherein a wall section of the resonance tube formed within the intake module is designed chamfering on both end faces of the wall section.

3. The intake system as claimed in claim 2, further comprising:
   a resonance valve housing,
   wherein the wall of the intake module has an opening into the resonance tube, and the resonance valve housing is inserted into the resonance tube through the wall opening.

4. The intake system as claimed in claim 1, further comprising:
   a resonance valve housing,
   wherein a wall of the intake module has an opening into the resonance tube, and the resonance valve housing is inserted into the resonance tube through the wall opening.

5. The intake system as claimed in claim 1, further comprising:
   a resonance valve housing,
   wherein the wall of the intake module has an opening into the resonance tube, and the resonance valve housing is inserted into the resonance tube through the wall opening.

6. An intake system for an internal combustion engine having at least two cylinder bank rows, comprising:
   an intake bend assigned to each cylinder bank row, each intake bend including at least one intake tube leading to each cylinder in the cylinder bank row to which the intake bend is assigned;
   distributor tube for distributing intake air;
   at least one resonance tube equipped with a switch valve, wherein
      the intake bends are in fluid communication with the distributor tube and the at least one resonance tube, and the resonance tube and the distributor tube are combined in a central intake module,
      the intake module is equipped with a connection for a throttle valve housing,
      the intake module has an oval cross section, and
      the resonance tube integrated into the intake module has an essentially circular cross-section.

7. The intake system as claimed in claim 6, wherein a portion of a lateral surface of the resonance tube is formed by a wall of the intake module.

8. The intake system according to claim 7, wherein a wall section of the resonance tube formed within the intake module is designed chamfering on both end faces of the wall section.

9. The intake system as claimed in claim 8, further comprising:
   a resonance valve housing,
   wherein the wall of the intake module has an opening into the resonance tube, and the resonance valve housing is inserted into the resonance tube through the wall opening.

10. The intake system as claimed in claim 7, further comprising:
    a resonance valve housing,
    wherein the wall of the intake module has an opening into the resonance tube, and the resonance valve housing is inserted into the resonance tube through the wall opening.

11. The intake system as claimed in claim 6, further comprising:
    a resonance valve housing,
    wherein the wall of the intake module has an opening into the resonance tube, and the resonance valve housing is inserted into the resonance tube through the wall opening.

* * * * *